US008526159B2

(12) United States Patent
Ludewig et al.

(10) Patent No.: US 8,526,159 B2

(45) Date of Patent: Sep. 3, 2013

(54) SURGE PROTECTOR HAVING A THERMAL SEPARATING DEVICE

(75) Inventors: Sascha Ludewig, Neumarkt (DE); Richard Daum, Neumarkt (DE); Georg Wittmann, Lauterhofen (DE); Florian Gaeck, Freystadt (DE)

(73) Assignee: DEHN + SÖHNE GmbH + Co. KG, Neumarkt/Opf. (DE)

(*) Notice: Subject to any disclaimer, the term of this patent is extended or adjusted under 35 U.S.C. 154(b) by 350 days.

(21) Appl. No.: 12/737,830

(22) PCT Filed: Jun. 24, 2009

(86) PCT No.: PCT/EP2009/057857

§ 371 (c)(1),
(2), (4) Date: May 6, 2011

(87) PCT Pub. No.: WO2010/020452

PCT Pub. Date: Feb. 25, 2010

(65) Prior Publication Data

US 2011/0222199 A1 Sep. 15, 2011

(30) Foreign Application Priority Data

Aug. 22, 2008 (DE) ......................... 10 2008 039 323
Sep. 16, 2008 (DE) ......................... 10 2008 047 396

(51) Int. Cl.
*H02H 1/00* (2006.01)

(52) U.S. Cl.
USPC ........................................... 361/124; 361/111

(58) Field of Classification Search
USPC ................. 361/103, 111, 115, 117, 118, 124, 361/125, 131
See application file for complete search history.

(56) References Cited

U.S. PATENT DOCUMENTS 6,226,166 B1 * 5/2001 Gumley et al. ............... 361/118
6,282,075 B1 * 8/2001 Chaudhry ..................... 361/111
6,327,129 B1 * 12/2001 Oertel et al. .................. 361/118

(Continued)

FOREIGN PATENT DOCUMENTS

DE 29519313 1/1996
EP 0716493 6/1996

(Continued)

OTHER PUBLICATIONS

International Preliminary Report on Patentability (Chapter I of the Patent Cooperation Treaty), in English dated Mar. 1, 2011.

*Primary Examiner* — Rexford Barnie
*Assistant Examiner* — Christopher Clark
(74) *Attorney, Agent, or Firm* — Gerald T. Bodner

(57) ABSTRACT

A surge protector includes a thermal separating device and an error display, and at least two first protection elements, particularly disk-shaped varistors (7), and at least one second protection element, particularly a gas arrester (9), wherein the first and the at least one second protection elements are switched in a Y arrangement. The surge protector further includes a device housing for accommodating the protection elements, and structure, such as a spring (11), for the mechanical biasing of the thermal separating device, wherein the thermal separating device has a low-melting solder, and the first protection elements (7) are disposed in the device housing such that a connection arm of a protection element (7) is positioned opposite the connection arm of the further protection element (7) at a distance, and the thermal separating device is predominantly positioned in the distance space (13) formed in such a manner.

20 Claims, 5 Drawing Sheets

(56) References Cited

U.S. PATENT DOCUMENTS

| | | | | |
|---|---|---|---|---|
| 7,738,231 | B2 * | 6/2010 | Lagnoux | 361/115 |
| 8,279,575 | B2 * | 10/2012 | Mao et al. | 361/124 |
| 2005/0280971 | A1 * | 12/2005 | Domejean et al. | 361/111 |
| 2006/0262478 | A1 * | 11/2006 | Chaudhry | 361/119 |

FOREIGN PATENT DOCUMENTS

| | | |
|---|---|---|
| EP | 0727091 | 8/1996 |
| WO | WO 95/12893 | 5/1995 |
| WO | WO 2007/105066 | 9/2007 |
| WO | WO 2008/068115 | 6/2008 |

* cited by examiner

SURGE PROTECTOR HAVING A THERMAL SEPARATING DEVICE

The invention relates to an overvoltage protection device comprising a thermal disconnection device and a fault indicator as well as at least two first protection elements, specifically disc-shaped varistors, and at least one second protection element, specifically a gas arrester, wherein the first and the at least one second protection elements are interconnected in a Y-arrangement, further comprising a device housing or supporting part for receiving the protection elements and means for mechanically preloading the thermal disconnection device, wherein the thermal disconnection device comprises a low-melting solder and the first protection elements are arranged in the device housing such that one connection pin of one protection element is positioned opposite the connection pin of the other first protection element at a distance, and the thermal disconnection device is located mainly in the so formed distance space, according to the preamble of patent claim 1.

BACKGROUND OF THE INVENTION

An overvoltage protection device comprising a thermal disconnection device is already known from the German Utility Model DE 295 19 313 U1. The surge arrester described in this document comprises a lower part which is electrically connected to ingoing and outgoing leads of the system to be protected or the device to be protected. In addition, a plug-in part is provided, which comprises at least one varistor. The plug-in part can be detachably, yet electrically connected to the lower part by a mechanical connector. A thermal release is provided on the plug-in part in the event of the varistor being inadmissibly heated. A supporting wall is located in the plug-in part, with the varistor being mounted on a side face of the supporting wall and the thermal disconnection device as well as corresponding connection means being provided on the other side face of the supporting wall. Thus, the thermal release is placed opposite the varistor.

The prior plug-in part is trough-shaped, with the bottom of the trough forming the aforementioned supporting wall and the edge of the trough surrounding the region next to the supporting wall in which the varistor provided on the supporting wall is located. The varistor itself is provided with two connecting lugs serving the electrical connection. One of the connecting lugs is connected to the thermal release element.

In the overvoltage protection device according to EP 0 727 091 B1 two or more varistors accommodated in a housing are provided as protection elements, whose earth electrodes are electrically interconnected by means of a strip with a contact piece. The mains electrodes are connected to contact pieces by means of disconnection devices connected in series to the protection elements.

According to EP 0 727 091 B1 the problem is to be overcome to simplify the disconnection device in structure, without disadvantageously affecting the protective properties.

To this end, all disconnection devices are arranged in the pivoting region of the web of an essentially U-shaped bail designed as a rocker and swivel-mounted in the housing. A displaceably mounted actuating bolt is bearing on the web, and an indicating device is further arranged on the bail. As a common rocker is allocated to all the disconnection devices, in turn allocated to protective elements installed in the overvoltage protection device, the construction is simplified. All the same it is ensured that when the disconnection device is opened (released), i.e. also when only one disconnection device is opened, the actuating bolt is displaced and the provided release indicating device reaches a position which indicates that an exchange of the overvoltage protection device is necessary.

In the device for protection against the occurrence of transient electrical overvoltages according to EP 0 716 493 B1 at least two varistors are provided. Moreover, separating means are provided which are sensitive with respect to the condition of the varistors, especially in thermal terms. Each of the varistors can and should be disconnected separately.

The generic document WO 2007/105066 A1 describes an overvoltage protection device comprising two disc-shaped varistors and a gas arrester, with the varistors and the gas arrester being interconnected in a Y-arrangement.

The varistors and the gas arrester are located on a circuit board. The two connection pins of the varistors are oriented to face each other, and a metallic electrical bridge is provided interconnecting the aforementioned connection pins by means of low-melting solder.

The bridge is held under a preload by means of a spring, with the spring being supported with one spring end on a bolt fixed on the circuit board.

The disconnecting bridge is connected to the gas arrester by means of a conductor section. In one practical embodiment the conductor section is realized as a flexible strand.

If the varistors are thermally overloaded the melting temperature of the low-melting solder is reached and the bridge is moved away from the connection pins of the varistors in the disconnecting direction. This solution, too, just like the other prior art, requires an additional separating means. Moreover, there is the risk of an undesired one-sided separation of the bridge.

SUMMARY OF THE INVENTION

Based on the foregoing it is the object of the invention to provide a further developed overvoltage protection device comprising a thermal disconnection device and the possibility of indicating a fault. The actual disconnection device is to be realized without additional technical means without function limitations resulting therefrom.

The solution to the object of the invention is achieved with an overvoltage protection device comprising a thermal disconnection device according to the combination of features defined in patent claim 1. The dependent claims define at least useful embodiments and advancements.

The solution according to the invention permits the realization of an overvoltage protection device in a Y-connection, which is formed of a minimum number of components, which is equipped with commercially available wired protection components, and which does not require any additional disconnecting elements. Additionally, an unequivocal status indication is provided, which is also readable in a currentless state.

The commercially available protection elements may be disc varistors and gas arresters.

The protection elements and means for mechanically preloading the thermal disconnection device are located in the device housing of the overvoltage protection device. The thermal disconnection device comprises a low-melting solder or the like means, e.g. a wax. The first protection elements are arranged in the device housing such that one connection pin of one protection element is positioned opposite the connection pin of the other protection element at a distance. The thermal disconnection device is located mainly in the so formed distance space.

According to the invention one connection pin of the second protection element, especially of a gas arrester, directly bypasses the aforementioned connection pins of the first protection elements in the distance space. In the distance space the connection pin of the second protection element contacts the corresponding connection pins of the first protection elements, preferably by a solder. A finger of a mechanically preloaded disconnecting component acts on the bypass connection pin in such a way that, in the event of an overload, the bypass connection pin is physically placed away from the connection pins of the first protection elements, resulting in the desired reliable disconnection from the mains.

According to a preferred embodiment the connection pins of the first protection elements are positioned substantially parallel relative to each other and are disposed on one plane.

In one embodiment, the connection pin of the second protection element includes an offset, that is, it is bent correspondingly, wherein the offset or bent end forms the region of the bypass connection pin which is connected to the connection pins of the first protection elements.

The bent end is oriented substantially perpendicular to the parallel connection pins of the first protection elements.

The other connection pins of the first protection elements are connected in the usual manner to contact pins or other connection elements of the overvoltage protection device, which is preferably realized in the form of a plug-in part.

At least the free ends of the bypassed connection pins of the protection elements and/or the bent end of the bypass connection pin have a flat, nearly plane shape obtained by pressing or the like measure.

In one embodiment of the invention the disc-shaped first protection elements are located in the device housing parallel relative to each other and separated by a wall, wherein the disconnecting component is mounted in the partition wall plane in a pivotably movable manner.

Preferably, the bypass connection pin is in a position upstream of the connection pins of the first protection element, and the finger of the disconnecting component includes an oblique bearing surface for the bypass connection pin for preventing a one-sided disconnection.

The finger of the disconnecting component engages behind the bypass connection pin at least in a partial section of the distance space so as to ensure that it is reliably carried along in the event of a disconnection.

Below the distance space a free space is provided in the device housing, which receives the bypass connection pin and the part of the disconnecting component pivoting into the same in the event of a disconnection.

On the end opposite the finger of the disconnecting component the disconnecting component is provided with a display surface known per se for indicating the status. This surface may be a colored surface symbolizing a proper state and, when pivoted, exposing a differently colored surface provided underneath thereof which then indicates the present fault condition.

Summarizing, the point of separation is formed by a wire bypass consisting of the bent and flat, pressed connecting wire of the second protection element, specifically of the gas arrester, wherein the same is connected to a flat, pressed connection pin of the varistors of the first protection element by the low-melting solder.

As the point of separation is formed of the original connection pins of the protection elements, which connection pins are, for this purpose, merely shaped, no further disconnecting elements or separating means are needed.

By displacing the wire bypass to be in front of the varistor connection pins and due to the aforementioned obliqueness of the disconnecting component in the bearing surface a one-sided disconnection is effectively prevented.

The invention shall be explained in more detail below by means of an embodiment and with the aid of figures.

DETAILED DESCRIPTION OF THE INVENTION

Figure 1:
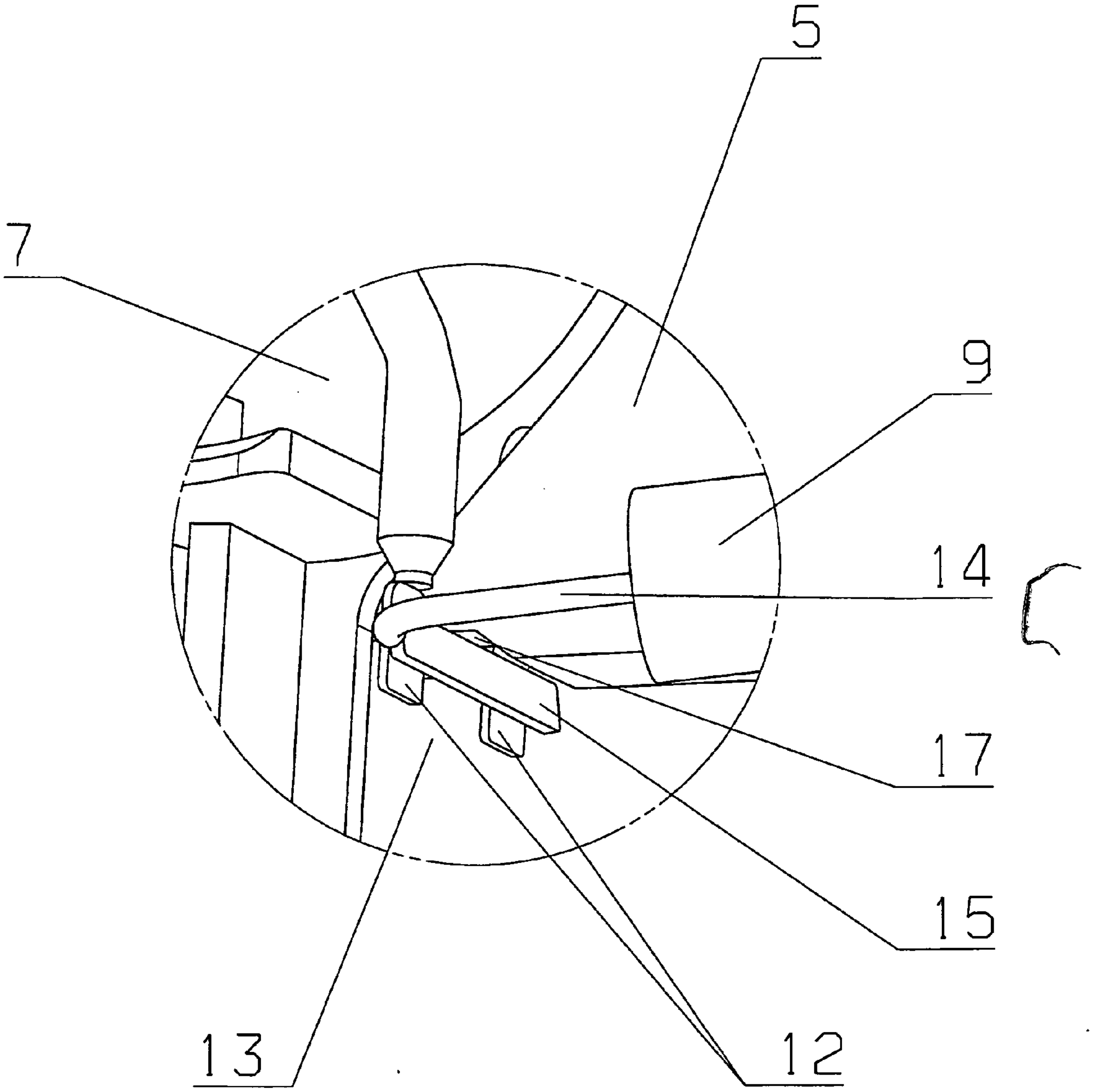
FIG. 1 shows a detailed view of the disconnection device including the connection pins of the first protection elements and the bypass connection pin of the second protection element located in the distance space.

The overvoltage protection device shown in the figures is made of a base plastic molding 1 which is surrounded by a cap not illustrated in the figures.

In the bottom area 2 of the base plastic molding 1 through holes for plug contacts 3 are provided. Moreover, a recess 4 is provided so as to trigger a remote indicator contact depending on the position of the disconnecting component 5.

The base plastic molding 1 comprises a partition wall 6.

On the left and right sides of the partition wall 6 a disc-shaped varistor 7 is located comprising, in each case, two connection pins.

A first connection pin of the respective varistor 7 is connected to one of the plug contacts 3.

A second connection pin extends into a free space 8 inside the base plastic molding 1.

Moreover, a gas arrester 9 is provided. A connecting wire 10 of the gas arrester 9 leads to one of the plug contacts 3. The varistors 7 and the gas arrester 9 are interconnected in a Y-connection.

The disconnecting component 5 is mounted in a pivotably movable manner on a pin-shaped prolongation which forms part of the base plastic molding 1. Furthermore, the disconnecting component is held under a mechanical preload by means of a spring 11.

To this end, one end of the spring 11 engages into a recess in the disconnecting component 5, while the other end of the spring 11 is held on an upright prolongation in the base plastic molding 1.

Figure 4:
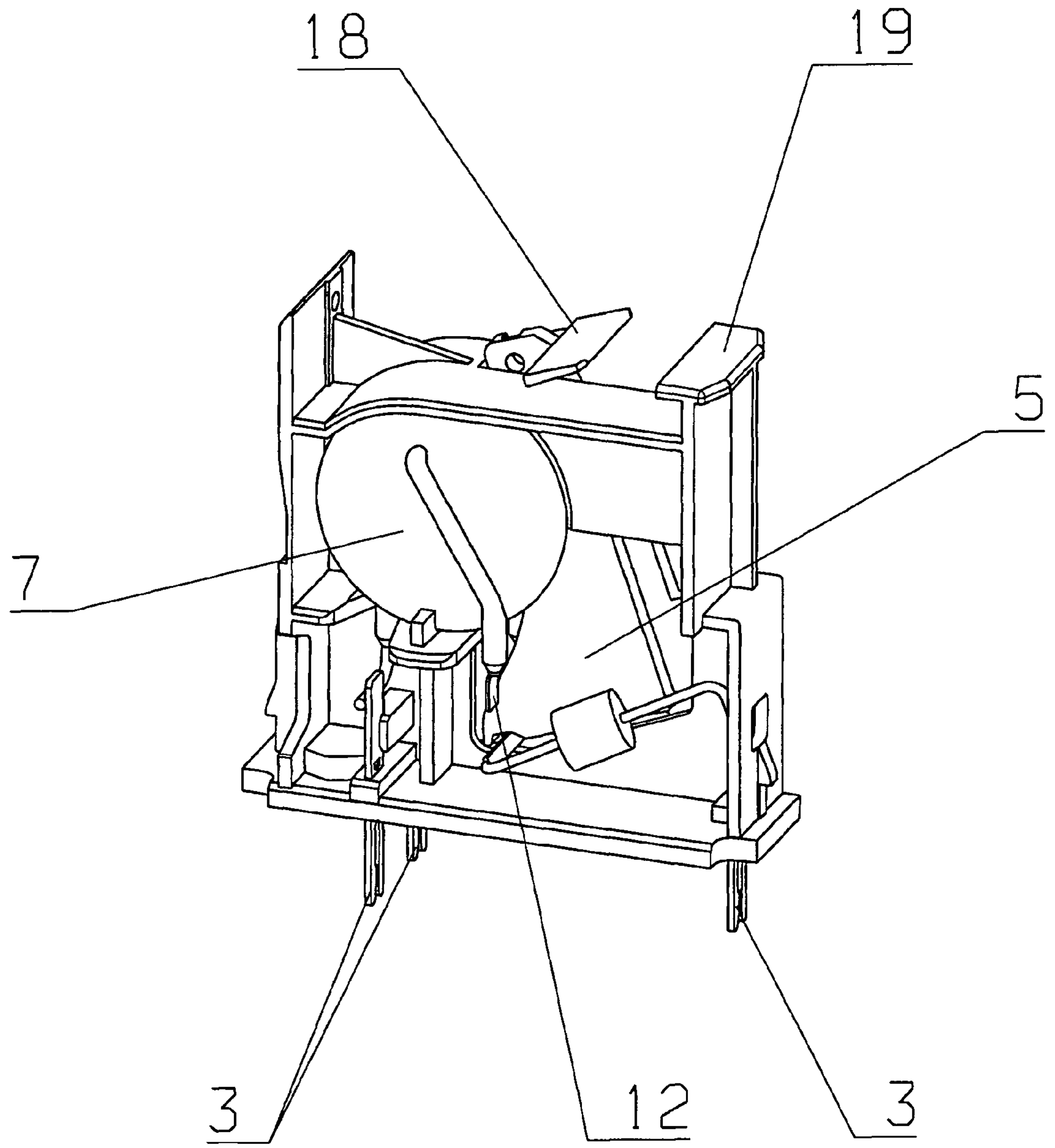
FIG. 4 shows the state after the reaction of the disconnection device in a lateral view similar to that of FIG. 2.
Figure 5:
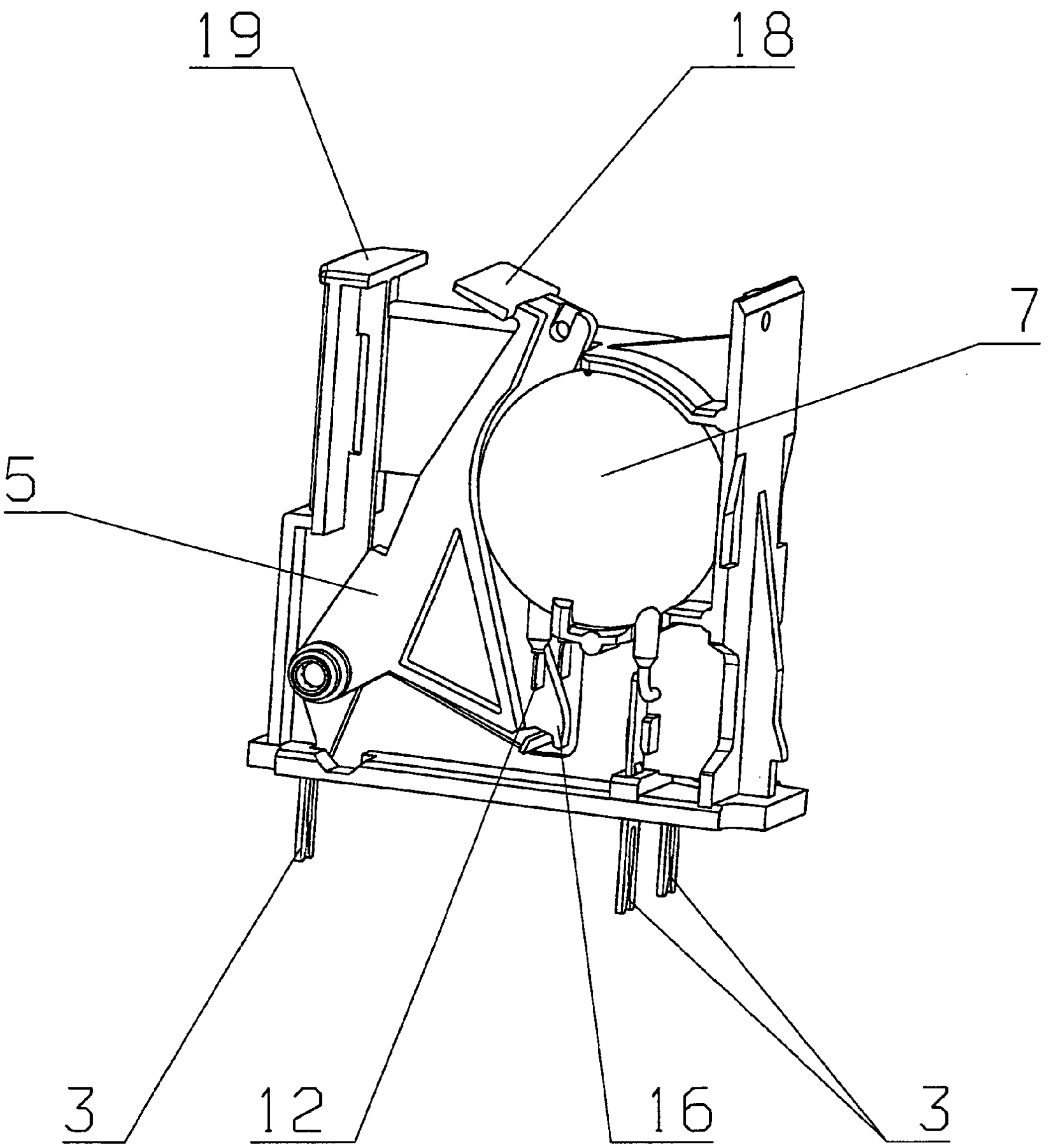
FIG. 5 shows the state after the reaction of the disconnection device in a view similar to that of FIG. 3.

In order to simplify the illustration the spring 11 was omitted in FIGS. 4 and 5.

The varistors 7 are each located on either side of the partition wall 6, in a position parallel next to each other in such a way that the varistor terminals 12 not leading to the plug contacts 3 are disposed substantially parallel next to each other and on one plane.

A distance space 13 is defined between the varistor terminals 12.

The distance space 13 and thus the varistor terminals 12 are directly bypassed by another connecting wire 14 of the gas arrester 9.

Thus, by means of an offset of the connecting wire 14, a bypass connection pin 15 is formed, which acts as a disconnecting element without any other separate means.

The disconnecting component 5 leads into a finger 16 (see FIG. 5). With a bearing surface the finger 16 presses against the bypass connection pin 15.

The bypass connection pin 15 is connected to the varistor terminals 12 by a low-melting solder.

The varistor terminals 12 are very short so that the bypass connection pin 15 is located close to the varistor and is correspondingly thermosensitive.

By means of the disconnecting component 5 and the finger 16, in cooperation with the spring 11, a permanent force is acting on the bypass connection pin 15.

An inadmissible heating of the varistor(s) leads to the heating of the solder which acts as connecting means. As a result, the spring-preloaded disconnecting component 5 including the finger 16 moves downwardly, as is shown in FIGS. 4 and 5, and presses the bypass connection pin 15 away from the point of connection between the varistor terminals 12, namely into a safe disconnected position.

The bent end of the connecting wire 14 of the gas arrester, which is particularly easy to recognize in FIG. 1, extends substantially perpendicular to the parallel connection pins 12 of the varistors 7.

The free ends of the varistor terminals 12 as well as the bypass connection pin 15 have a flat shape, wherein this desired flat shape may be obtained, for instance, by a pressing pressure.

Physically, the bypass connection pin 15 is located upstream of the varistor terminals 12, which represent the first protection elements.

The finger 16 of the disconnecting component 5 additionally includes an oblique bearing surface 17. The oblique bearing surface 17 permits, in combination with the shape of the finger 16 which engages behind the distance space at least in a partial section, to effectively prevent a one-sided disconnection.

In the event of a disconnection the free space 8 receives the bypass connection pin 15 and the part of the disconnecting component 5 pivoting into the same (see FIGS. 4 and 5).

The end of the disconnecting component 5 opposite the finger 16 comprises a display surface 18.

Figure 2:
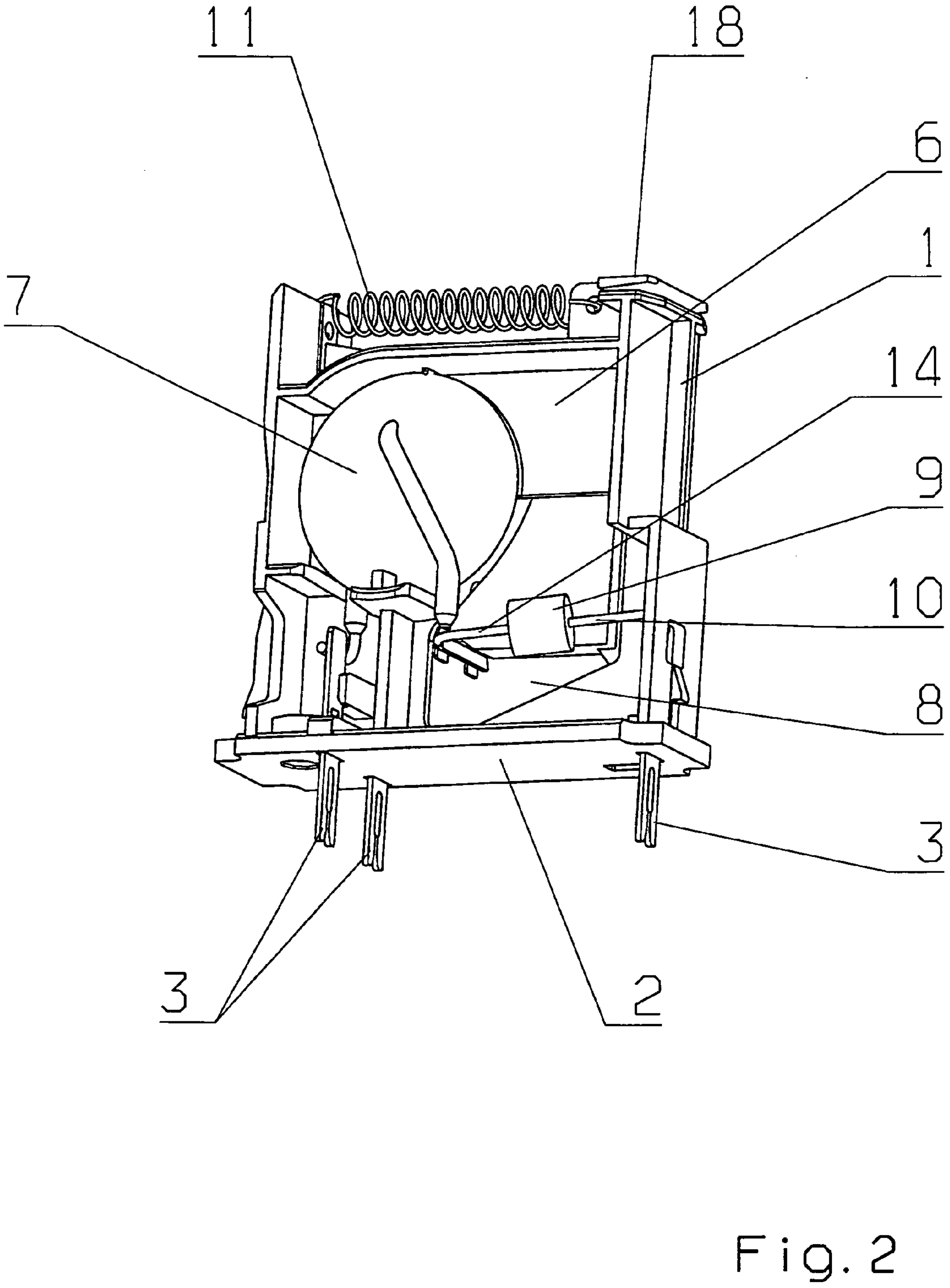
FIG. 2 shows a first lateral view of the overvoltage protection device with a preloaded disconnecting component.
Figure 3:
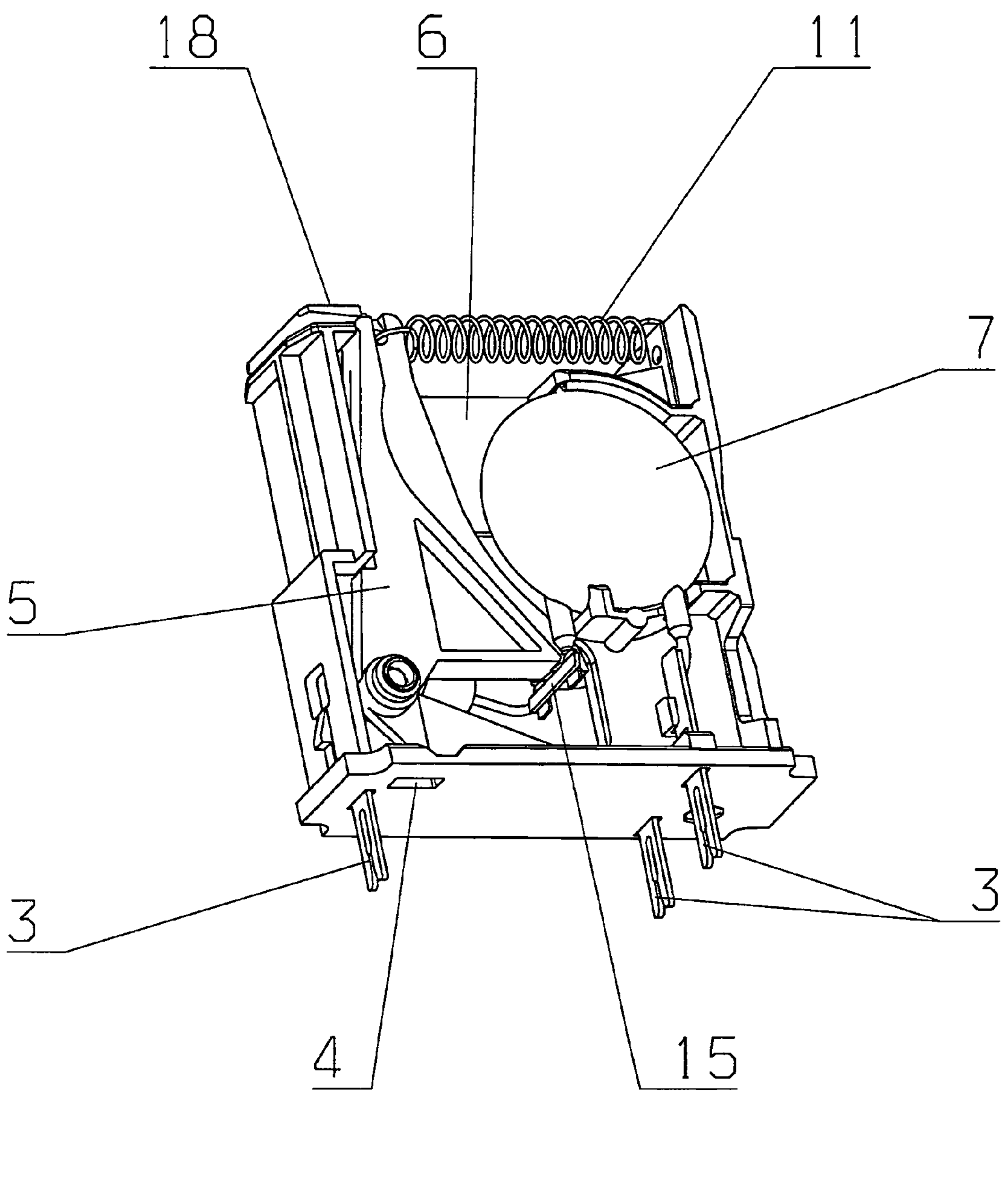
FIG. 3 shows a second lateral view of the overvoltage protection device with a preloaded disconnecting component.

In the proper operating state (see FIGS. 2 and 3) the display surface 18 covers a signal surface 19 provided underneath the former, which may be colored in red. In the fault state (see FIGS. 4 and 5) the display surface 18 of the disconnecting component 5 moves away from the congruent position relative to the signal surface 19 so that the signal surface 19 is exposed. A corresponding view window in the non-illustrated housing cap then reveals the signal surface 19 and indicates the fault state.

LIST OF REFERENCE NUMBERS

1 base plastic molding
2 bottom area
3 plug contact
4 recess
5 disconnecting component
6 partition wall
7 varistor
8 free space
9 gas arrester
10; 14 connecting wire
11 spring
12 varistor terminal
13 distance space
15 bypass connection pin
16 finger
17 oblique bearing surface
18 display surface
19 signal surface

The invention claimed is:

1. An overvoltage protection device comprising a thermal disconnection device and a fault indicator as well as at least two first protection elements, specifically disc-shaped varistors (7), and at least one second protection element, specifically a gas arrester (9), each of the at least two first protection elements (7) having a connection pin (12), wherein the at least two first protection elements (7) and the at least one second protection element (9) are interconnected in a Y-arrangement, further comprising a device housing or supporting part for receiving the first and second protection elements and means (11) for mechanically preloading the thermal disconnection device, wherein the thermal disconnection device comprises a low-melting solder or the like means and the first protection elements (7) are arranged such that the connection pin (12) of one first protection element (7) is positioned opposite the connection pin (12) of the other first protection element (7) at a distance to form a distance space therebetween, and the thermal disconnection device is located mainly in the so formed distance space (13), characterized in that the thermal disconnection device further includes a bypass connection pin (15) of the second protection element (9) which directly bypasses the distance space and provides an electrical connection between the aforementioned connection pins (12) of the first protection elements (7) in the distance space (13) in a solder-contacted manner, and wherein the mechanically preloaded disconnecting component (5) includes a finger (16) which acts on the bypass connection pin (15) in such a way that, in the event of an overload, the bypass connection pin (15) is physically placed away from the connection pins (12) of the first protection elements (7).

2. The overvoltage protection device according to claim 1, characterized in that the connection pins (12) of the first protection elements (7) extend substantially parallel relative to each other and are disposed on one plane.

3. The overvoltage protection device according to claim 2, characterized in that the second protection element (9) includes a connection pin (14) having an offset end, wherein the offset end forms at least a portion of the bypass connection pin (15).

4. The overvoltage protection device according to claim 3, characterized in that the offset end of the connection pin (14) of the second protection element (9) is oriented substantially perpendicular to the parallelly disposed connection pins (12) of the first protection elements (7).

5. The overvoltage protection device according to claim 1, characterized in that at least a portion of one of the connection pins (12) of the first protection elements (7) and the bypass connection pin (15) of the second protection element has a flat, plane shape obtained by pressing or the like measure.

6. The overvoltage protection device according to claim 1, characterized in that the device housing or supporting part includes a partition wall (6), wherein the first protection elements (7) are located in the device housing or on the supporting part parallel relative to each other and separated by the partition wall (6), the partition wall residing in a plane, and wherein the disconnecting component (5) is mounted in the partition wall plane in a pivotably movable manner.

7. The overvoltage protection device according to claim 1, characterized in that the bypass connection pin (15) is positioned across the connection pins (12) of the first protection elements (7), and the finger (16) of the disconnecting component (5) includes an oblique bearing surface (17) for the bypass connection pin (15) for preventing a one-sided disconnection.

8. The overvoltage protection device according to claim 1, characterized in that the finger (16) of the disconnecting component (5) engages behind the bypass connection pin (15) at least in a partial section of the distance space (13).

9. The overvoltage protection device according to claim 1, characterized in that below the distance space (13) a free space (8) is provided in the device housing or on the supporting part, which receives the bypass connection pin (15) and a part of the disconnecting component (5) pivoting into the same in the event of a disconnection.

10. The overvoltage protection device according to claim 1, characterized in that the disconnecting component (5) includes a display surface (18) situated on an end thereof opposite the finger (16) of the disconnecting component (5) for indicating the status.

11. The overvoltage protection device according to claim 2, characterized in that at least a portion of one of the connection pins (12) of the first protection elements (7) and the bypass connection pin (15) of the second protection element has a flat, plane shape obtained by pressing or the like measure.

12. The overvoltage protection device according to claim 3, characterized in that at least a portion of one of the connection pins (12) of the first protection elements (7) and the bypass connection pin (15) of the second protection element has a flat, plane shape obtained by pressing or the like measure.

13. The overvoltage protection device according to claim 4, characterized in that at least a portion of one of the connection pins (12) of the first protection elements (7) and the bypass connection pin (15) of the second protection element has a flat, plane shape obtained by pressing or the like measure.

14. The overvoltage protection device according to claim 2, characterized in that the device housing or supporting part includes a partition wall (6), wherein the first protection elements (7) are located in the device housing or on the supporting part parallel relative to each other and separated by the partition wall (6), the partition wall residing in a plane, and wherein the disconnecting component (5) is mounted in the partition wall plane in a pivotably movable manner.

15. The overvoltage protection device according to claim 3, characterized in that the device housing or supporting part includes a partition wall (6), wherein the first protection elements (7) are located in the device housing or on the supporting part parallel relative to each other and separated by the partition wall (6), the partition wall residing in a plane, and wherein the disconnecting component (5) is mounted in the partition wall plane in a pivotably movable manner.

16. The overvoltage protection device according to claim 4, characterized in that the device housing or supporting part includes a partition wall (6), and wherein the first protection elements (7) are located in the device housing or on the supporting part parallel relative to each other and separated by the partition wall (6), the partition wall residing in a plane, and wherein the disconnecting component (5) is mounted in the partition wall plane in a pivotably movable manner.

17. The overvoltage protection device according to claim 5, characterized in that the device housing or supporting part includes a partition wall (6), and wherein the first protection elements (7) are located in the device housing or on the supporting part parallel relative to each other and separated by the partition wall (6), the partition wall residing in a plane, and wherein the disconnecting component (5) is mounted in the partition wall plane in a pivotably movable manner.

18. The overvoltage protection device according to claim 2, characterized in that the bypass connection pin (15) is positioned across the connection pins (12) of the first protection elements (7), and the finger (16) of the disconnecting component (5) includes an oblique bearing surface (17) for the bypass connection pin (15) for preventing a one-sided disconnection.

19. The overvoltage protection device according to claim 3, characterized in that the bypass connection pin (15) is positioned across the connection pins (12) of the first protection elements (7), and the finger (16) of the disconnecting component (5) includes an oblique bearing surface (17) for the bypass connection pin (15) for preventing a one-sided disconnection.

20. The overvoltage protection device according to claim 4, characterized in that the bypass connection pin (15) is positioned across the connection pins (12) of the first protection elements (7), and the finger (16) of the disconnecting component (5) includes an oblique bearing surface (17) for the bypass connection pin (15) for preventing a one-sided disconnection.

* * * * *